United States Patent
Serpe et al.

(10) Patent No.: US 6,608,735 B1
(45) Date of Patent: Aug. 19, 2003

(54) ASYMMETRIC TAPERED AIR BEARING SLIDER

(75) Inventors: Catalin Ioan Serpe, Roseville, MN (US); Weimin Qian, Bloomington, MN (US); Mary Cynthia Hipwell, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 196 days.

(21) Appl. No.: 09/892,173

(22) Filed: Jun. 26, 2001

Related U.S. Application Data

(60) Provisional application No. 60/237,960, filed on Oct. 4, 2000.

(51) Int. Cl.$^7$ .................................................. G11B 17/32
(52) U.S. Cl. ................. 360/236.4; 360/236; 360/236.2; 360/236.9; 360/235.6
(58) Field of Search ................................ 360/235.1–235.9, 360/236.1–236.9

(56) References Cited

U.S. PATENT DOCUMENTS

| | | | |
|---|---|---|---|
| 3,823,416 A | | 7/1974 | Warner .................. 360/122 |
| 4,475,135 A | | 10/1984 | Warner et al. |
| 4,673,996 A | | 6/1987 | White |
| 4,870,519 A | | 9/1989 | White |
| 4,893,204 A | | 1/1990 | Yamada et al. |
| 4,939,603 A | | 7/1990 | Inumochi |
| 5,019,930 A | * | 5/1991 | Takeya |
| 5,062,017 A | | 10/1991 | Strom et al. |
| 5,210,666 A | * | 5/1993 | Chapin et al. |
| 5,343,343 A | | 8/1994 | Chapin |
| 5,508,862 A | | 4/1996 | Lazzari et al. |
| 5,515,219 A | * | 5/1996 | Ihrke et al. |
| 5,774,304 A | * | 6/1998 | Crane et al. |
| 5,799,388 A | | 9/1998 | Shouji ................... 29/603.09 |
| 5,831,791 A | | 11/1998 | Chhabra |
| 5,889,635 A | | 3/1999 | Sato |
| 5,914,833 A | * | 6/1999 | Yotsuya et al. |
| 6,034,842 A | * | 3/2000 | Cha |
| 6,134,083 A | | 10/2000 | Warmka ................... 360/235.6 |
| 6,147,838 A | | 11/2000 | Chang et al. ............ 360/235.6 |
| 6,178,064 B1 | * | 1/2001 | Chang et al. |
| 6,246,545 B1 | * | 6/2001 | Ono et al. ................ 360/236.7 |
| 6,452,750 B1 | * | 9/2002 | Fukuroi et al. .......... 360/236.4 |
| 6,483,667 B1 | * | 11/2002 | Berg et al. ............... 360/235.6 |
| 6,525,909 B1 | * | 2/2003 | Qian et al. ............... 360/235.7 |

OTHER PUBLICATIONS

Disclosure Entitled "Slider Feature Changes to Increase Shock Resistance" from IBM Technical Disclosure Bulletin, dated Feb. 1, 1994—vol. 37, Issue 2A, pp. 343–344.
*Characteristics of Air Bearing Suction Force in Magnetic Recording Disks*; Peng, Hardie; Aug. 7, 1995; ASME: J Trib.
*Slider–Disk Interactions During the Load–Unload Process*; Jeong; Bogy; Sep. 1990; IEEE Transactions on Magnetics, vol. 26, No. 5.
*Theoretical Prediction of Ramp Loading/Unloading Process in Hard Disk Drives*; Peng; 1998; ASME: Trib.
*Air Bearing Dynamics of Sub–Ambient Pressure Sliders During Dynamic Unload*; Hu, Jones, Li; 1998; ASME: Trib.
*Friction Force, Contact Resistance, and Lubricant Shear Behavior at the Magnetic Head–Disk Interface During Starting*; Wang, Komvopoulos; 1997; ASME: J Trib.

* cited by examiner

*Primary Examiner*—Allen Cao
(74) *Attorney, Agent, or Firm*—Kinney & Lange, P.A.

(57) ABSTRACT

An air bearing slider includes an asymmetric taper for control of pressurization and suction force formation. The asymmetric taper is disposed on an edge of a slider to accommodate for the speed differential across the disc radial direction, thereby improving take-off performance, reducing sensitivity to skew angle and altitude variation, and reducing the severity of impacts during ramp loading and unloading. A leading taper intersecting a leading surface and air bearing surface of the slider is asymmetric about a longitudinal, bisecting plane of the slider. In another embodiment, side taper intersecting a side surface and air bearing surface of the slider is asymmetric about a latitudinal, bisecting plane of the slider. In another embodiment, rail taper intersecting a rail recess surface and air bearing surface of the slider is asymmetric about a longitudinal, rail-bisecting plane.

19 Claims, 7 Drawing Sheets

ASYMMETRIC TAPERED AIR BEARING SLIDER

CROSS REFERENCE TO RELATED APPLICATION

This application claims priority from provisional U.S. patent application Ser. No. 60/237,960, filed on Oct. 4, 2000 for "Asymmetric Taper Air Bearing" by Catalin Serpe, Weimin Qian, and Mary Hipwell.

BACKGROUND OF THE INVENTION

The present invention relates to an air bearing slider for use in a data storage device such as a disc drive. More particularly, it relates to an air bearing slider which allows for control of pressurization and suction force formation.

Air bearing sliders have been extensively used in magnetic disc drives to appropriately position a transducing head above a rotating disc. In a disc drive, each transducer "flies" just a few nanometers above a rotating disc surface. The transducer is mounted in a slider assembly which has a contoured surface which faces the disc surface. An air bearing force is produced by pressurization of the air as it flows between the disc and slider and is a consequence of the slider contour and relative motion of the two surfaces. The air force prevents unintentional contact between the transducer and the disc. The air bearing also provides a very narrow clearance between the slider transducer and the rotating disc. This allows a high density of magnetic data to be transferred and reduces wear and damage.

In most high capacity storage applications, when the disc is at rest, the air bearing slider is in contact with the disc. During operation, the disc rotates at high speeds, which generates a wind of air immediately adjacent to the flat surface of the disc. This wind acts upon a lower air bearing surface of the slider and generates a lift force directing the slider away from the disc and against a load beam causing the slider to fly at an ultra-low height above the disc.

In negative pressure sliders, the wind also acts upon a portion of the air bearing surface of the slider to generate a suction force. The suction force counteracts the lift force by pulling the slider back toward the surface of the disc. A slider is typically mounted on a gimbal and load beam assembly which biases the slider toward the rotating disc, providing a pre-load force opposite to the lift force acting on the air bearing surface of the slider. For the slider to maintain the ultralow flying height above the surface of the disc, the lift force must be balanced with the pre-load and suction forces.

As disc storage systems are designed for greater and greater storage capacities, the density of concentric data tracks on discs is increasing (that is, the size of data tracks and radial spacing between data tracks is decreasing), requiring that the air bearing gap between the transducing head carried by the slider and the rotating disc be reduced. One aspect of achieving higher data storage densities in discs is operating the air bearing slider at ultra-low flying heights.

However, shrinking the air bearing gap and operating the slider at ultra-low flying heights has become a source of intermittent contact between the transducing head and the disc. Furthermore, when a disc drive is subjected to a mechanical shock of sufficient amplitude, the slider may overcome the biasing preload force of the load beam assembly and further lift away from or off the disc. Damage to the disc may occur when the slider returns to the disc and impacts the disc under the biasing force of the load beam. Such contact can result in catastrophic head-disc interface failure. Damage to the disc may include lost or corrupted data or, in a fatal disc crash, render the disc drive inoperable. Contact resulting in catastrophic failure is more likely to occur in ultra-low flying height systems. Additionally, intermittent contact induces vibrations detrimental to the reading and writing capabilities of the transducing head.

For the disc drive to function properly, the slider must maintain the proper fly height and provide adequate contact stiffness to assure that the slider does not contact the disc during operation. Also, the air bearing slider must have enhanced take-off performance at start up to limit contact between the slider and the disc. Such contact would cause damage to the slider during take-off and landing of the slider.

Air bearing sliders typically possess three primary degrees of movement, which are vertical motion, pitch, and roll rotation. The movement is relative to the gimbal and load beam associated with three applied forces upon the slider defined as pre-load, suction, and lift force. Steady state fly attitude for the slider is achieved when the three applied forces balance each other. A typical air bearing slider has a taper or step at its leading edge to provide for fast pressure buildup during takeoff of the slider from a resting position to a flying altitude above the disc. Air bearing sliders have a trailing edge at which thin film transducers are deposited. Typically, the air bearing surface includes longitudinal rails or pads extending from the leading edge taper toward the trailing edge. The rail design determines the pressure generated by the slider. The pressure distribution underneath the slider determines the flying characteristics, including flying height and pitch and roll of the slider relative to a rotating magnetic disc. Other characteristics that are affected by the configuration of the air bearing surface of a slider are takeoff velocity, air bearing stiffness, and track seek performance.

Flying height is one of the most critical parameters of magnetic recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations, and air bearing skew angles.

The amount of lift of a slider having parallel rails depends upon relative speed of the slider to the rotating magnetic disc. Normally, the amount of lift increases as the relative speed increases. With movement in a circular pattern, the outside rail of the slider necessarily travels at a higher speed relative to the disc than the inside rail of the slider.

BRIEF SUMMARY OF THE INVENTION

This invention provides control of pressurization and/or suction force formation in air bearing sliders so that the slider flies with controlled roll. An asymmetric taper is disposed on the edge(s) of a slider. The asymmetric taper helps accommodate for the speed differential across the disc radial direction, thereby improving take-off performance, reducing sensitivity to skew angle and altitude variation, and reducing the severity of impacts during ramp loading and unloading.

In one aspect, a leading taper intersecting a leading surface and air bearing surface of the slider is asymmetric about a longitudinal, bisecting plane of the slider. In another aspect, a side taper intersecting a side surface and air bearing surface of the slider is asymmetric about a latitudinal, bisecting plane of the slider. In a third aspect, a rail taper intersecting a rail recess surface and air bearing surface of the slider is asymmetric about a longitudinal, rail-bisecting plane.

The asymmetric taper can be disposed so as to provide increased pressurization on the side of the slider with the lowest air flow velocity (e.g. the inner rail) for faster take off and increased stability of the air bearing. Alternatively, the increased pressurization can be directed toward the outer rail in ramp load / unload operation such that contact between the slider and the disc is avoided or reduced.

DETAILED DESCRIPTION

Figure 1:
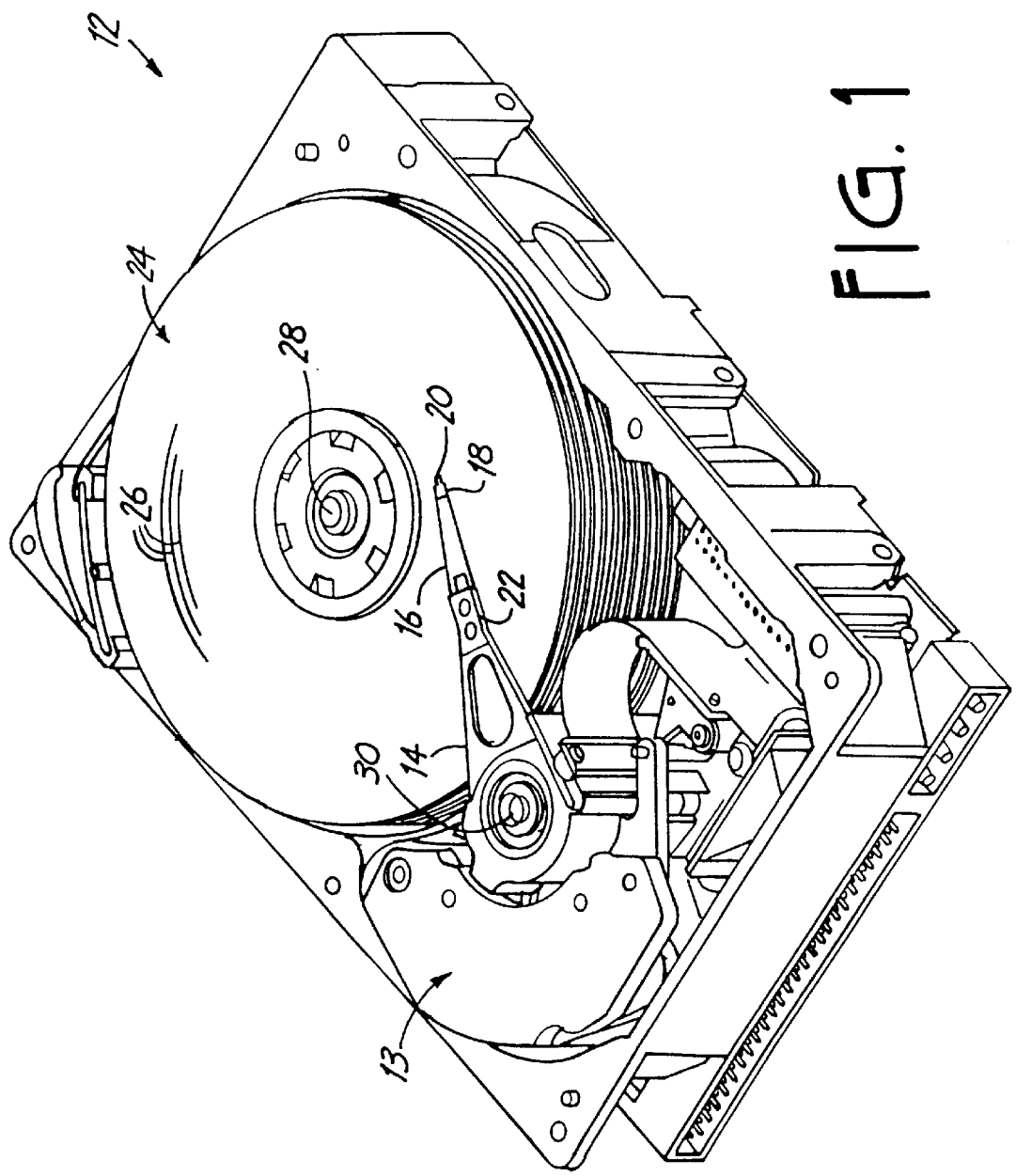
FIG. 1 shows a top perspective view of a disc drive.

FIG. 1 shows a top perspective view of a disc drive 12, which includes a voice coil motor (VCM) 13, actuator arm 14, suspension 16, flexure 18, slider 20, head mounting block 22, and disc 24. Slider 20 is connected to the distal end of suspension 16 by flexure 18. Suspension 16 is connected to actuator arm 14 at head mounting block 22. Actuator arm 14 is coupled to VCM 13. As shown on the right side of FIG. 1, disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. VCM 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
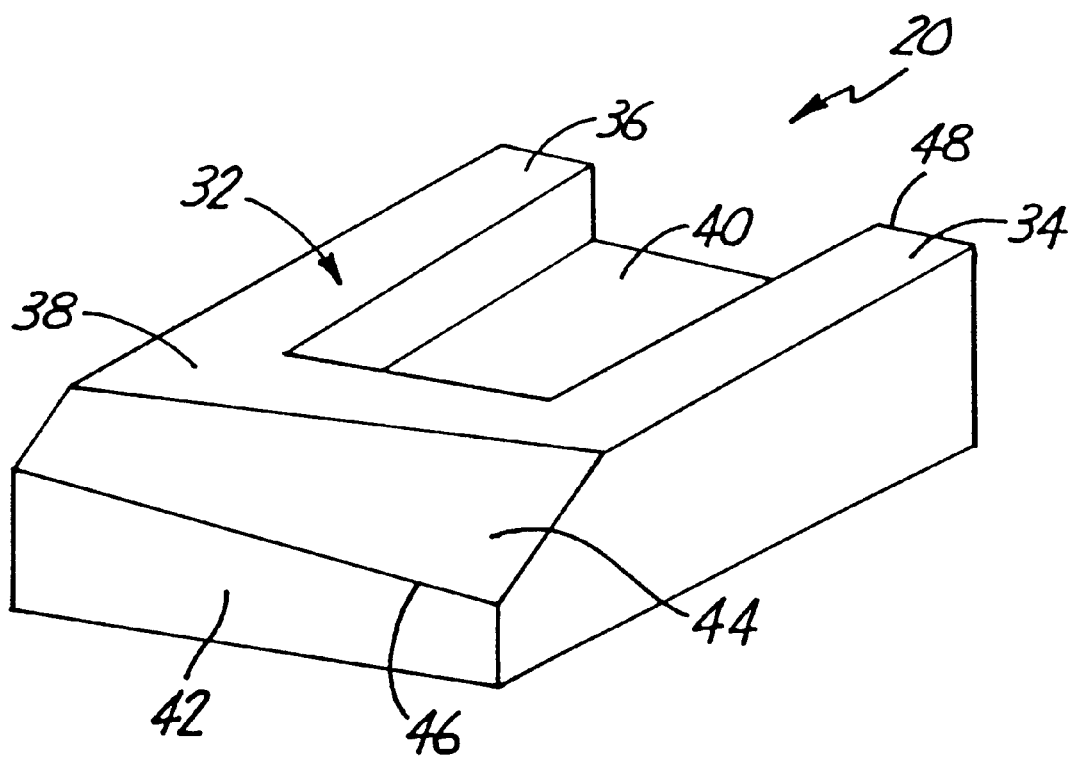
FIG. 2 is a perspective view of a slider embodying the present invention.

FIG. 2 is a perspective view of a slider 20 embodying the present invention. Slider 20 is inverted to show air bearing surface 32. The amount of lifting across the width of slider 20 can be controlled by employing a structure in which an asymmetrical taper is disposed on slider 20 such that the taper is asymmetric about a longitudinal, bisecting plane of slider 20.

In a preferred embodiment, slider 20 includes air bearing surface 32, inner side rail 34, outer side rail 36, cross rail 38, recessed region or cavity 40, leading surface 42, taper surface 44, leading edge 46, and trailing edge 48. Air bearing surface 32 is disposed on the disc opposing surface of slider 20 and comprises inner side rail 34 and outer side rail 36, which are connected by cross rail 38. The three rails 34, 36, and 38 enclose cavity 40, which defines a subambient pressure zone or negative pressure region.

Slider 20 includes leading surface 42, which resides at the front end of slider 20 when slider 20 is in motion relative to a magnetic disc (not shown). Leading surface 42 is substantially perpendicular to air bearing surface 32. Asymmetric leading taper surface 44 intersects air bearing surface 32 and leading surface 42. In this embodiment, taper surface 44 is disposed across the entire width of slider 20.

In this example, planar taper surface 44 is wider and deeper on the side of inner rail 34 than outer rail 36. Thus, air flows more rapidly under inner rail 34 than outer rail 36, as compared to a symmetrical taper. Increased air flow under inner rail 34 causes increased pressurization and increased lift, particularly during take off. Asymmetric taper 44 thereby compensates for the difference in tangential speed between inner rail 34 and outer rail 36 by providing a counteractive difference in air mass flow. This results in correcting roll angle across the width of slider 20. As shown in FIG. 2, the wider side of taper 44 is nearly twice as wide as the narrower side of taper 44. Additionally, taper 44 is shown about evenly angled, i.e., at about 45°, with respect to air bearing surface 32 and with respect to leading surface 42. This is illustrative only. In practice, the asymmetry of taper 44 may be more or less pronounced. The angle of taper 44 can also vary. Precise determinations may depend on such factors as the speed, height, and pitch of flight, and the contours of air bearing surface 32.

Because taper 44 intersects leading surface 42, its effect on air pressurization of air bearing surface 32 is more significant during take-off than during flight. Before take-off, air bearing surface 32 rests on a magnetic recording disc. During take-off, air is directed between air bearing surface 32 and the disc. The air flows under taper surface 44 and across air bearing surface 32. Taper surface 44 helps to create a lifting force which assists in achieving a fast take-off. During flight, air pressurization is caused primarily by side rails 34 and 36 and cavity 40; the influence of asymmetric taper 44 is still present, but is much less significant.

Figure 3:
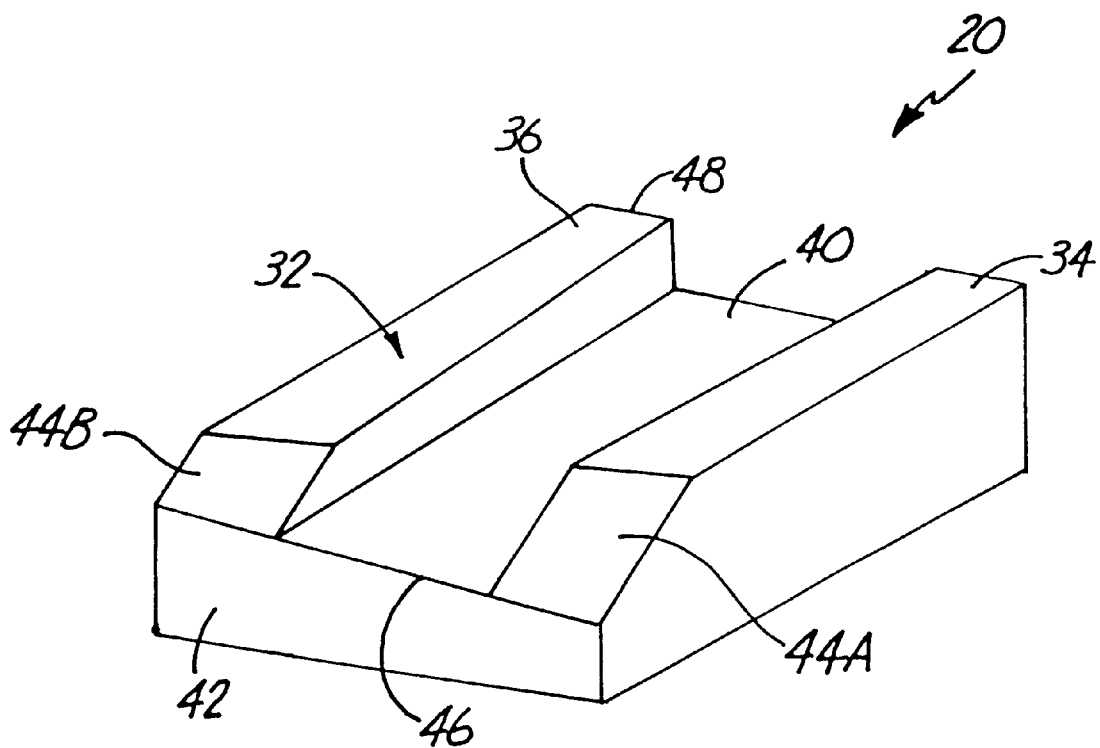
FIG. 3 is a perspective view of another slider embodying the present invention.

FIG. 3 is a perspective view of another embodiment of slider 20. In this embodiment of a catamaran-type slider, cross rail 18 is eliminated, and the taper surface 44 comprises inner taper surface 44A and outer taper surface 44B. The area of inner taper surface 44A is greater than that of outer taper surface 44B. This results in more rapid air flow over inner rail 34 than outer rail 36, thereby overcoming the difference in tangential speed between the two rails and resulting in a roll correction.

As can be appreciated, air bearing surface 32 may have many features which will affect the flow of air besides taper surface 44, such as the shape, position, and size of side rails 34 and 36, the configuration of cavity 40, the presence or absence of members such as a cross rail or center rail, and other features. However, this discussion will focus on the effect of asymmetric taper surface 44 compared to a symmetric taper surface, assuming the other features of air bearing surface 32 are the same.

Figure 4:
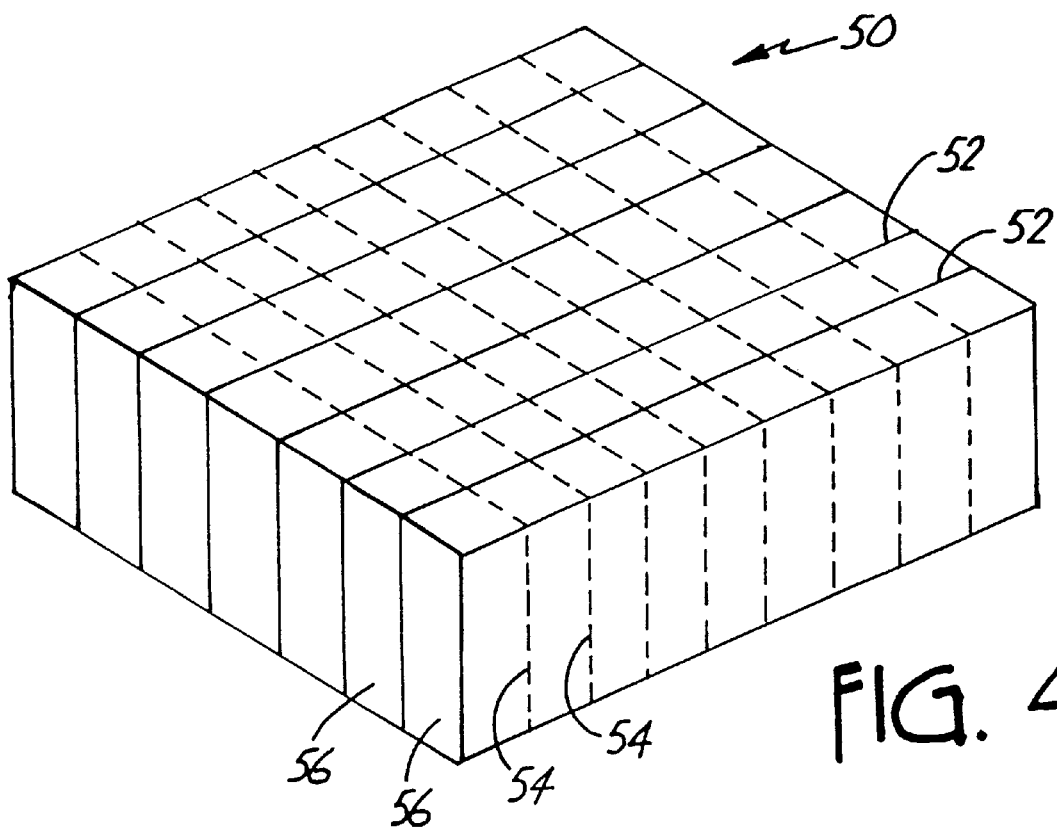
FIG. 4 is a perspective view of a wafer from which a plurality of sliders is produced.
Figure 5:
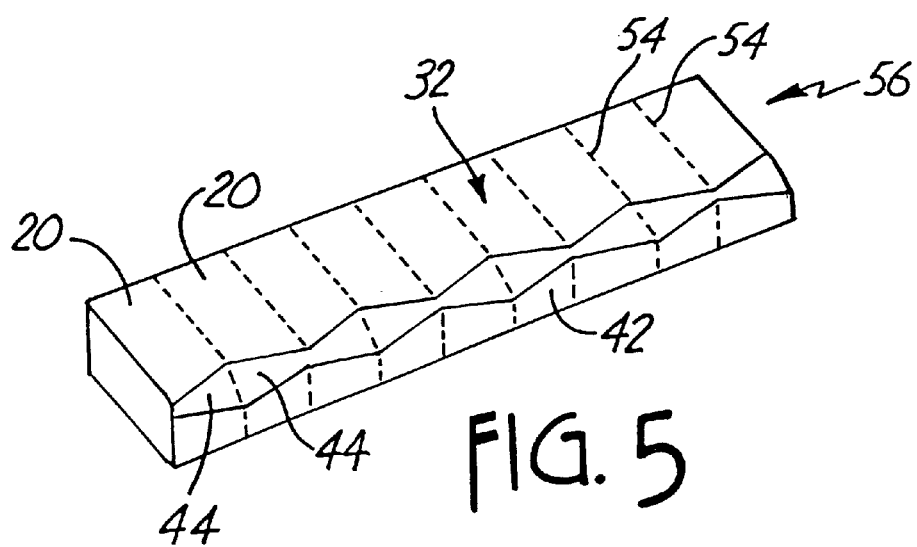
FIG. 5 is a perspective view of a slider bar showing a plurality of slider units embodying the present invention during an intermediate formation step.

FIGS. 4 and 5 represent an exemplary method of forming an asymmetric taper air leaving slider of the present invention. FIG. 4 is a perspective view of a wafer 50 from which a plurality of sliders 20 is produced. Wafer 50 may be formed of an electrically-conductive, ceramic material such as $Al_2O_3$-TiC, AlTiC, TiC, Si, SiC, $ZrO_2$ or other composite materials formed of combinations of these materials. Optionally, a plurality of parallel grooves 52 and a plurality of parallel, orthogonally positioned grooves 54 may be formed on wafer 50. Grooves 52 and 54 prevent chipping that may occur during cutting of wafer 50 into bars 56 and individual sliders 20. After fabrication of transducers thereon, wafer 50 is severed along grooves 52 to form slider bars 56.

FIG. 5 shows slider bar 56 including a plurality of slider units 20 embodying the present invention during an intermediate formation step. One of the cut surfaces of each bar 56 is lapped to form air bearing surface 32. This lapping process, in combination with photolithographic material removal, may result in side rails 34 and 36, cross rail 38, and cavity 40, as shown in FIG. 2. Bar 56 may be processed to dispose asymmetric taper surface 44, which intersects leading surface 42 and air bearing surface 32, on each slider 20 before the sliders 20 of bar 56 are cut apart from each other along grooves 54. Alternatively, and especially for more complex taper configurations, sliders 20 may be cut from bar 56 along grooves 54 prior to the fashioning of taper 44 on each individual slider 20. Taper surface 44 may be formed by known processes, such as by machining, chemical or focused ion beam etching, or lithographic techniques. The particular technique may be chosen depending on the geometry of the desired taper. For example, very simple planar tapers are easily machined, while complex multiregional tapers are more precisely etched.

Figure 6:
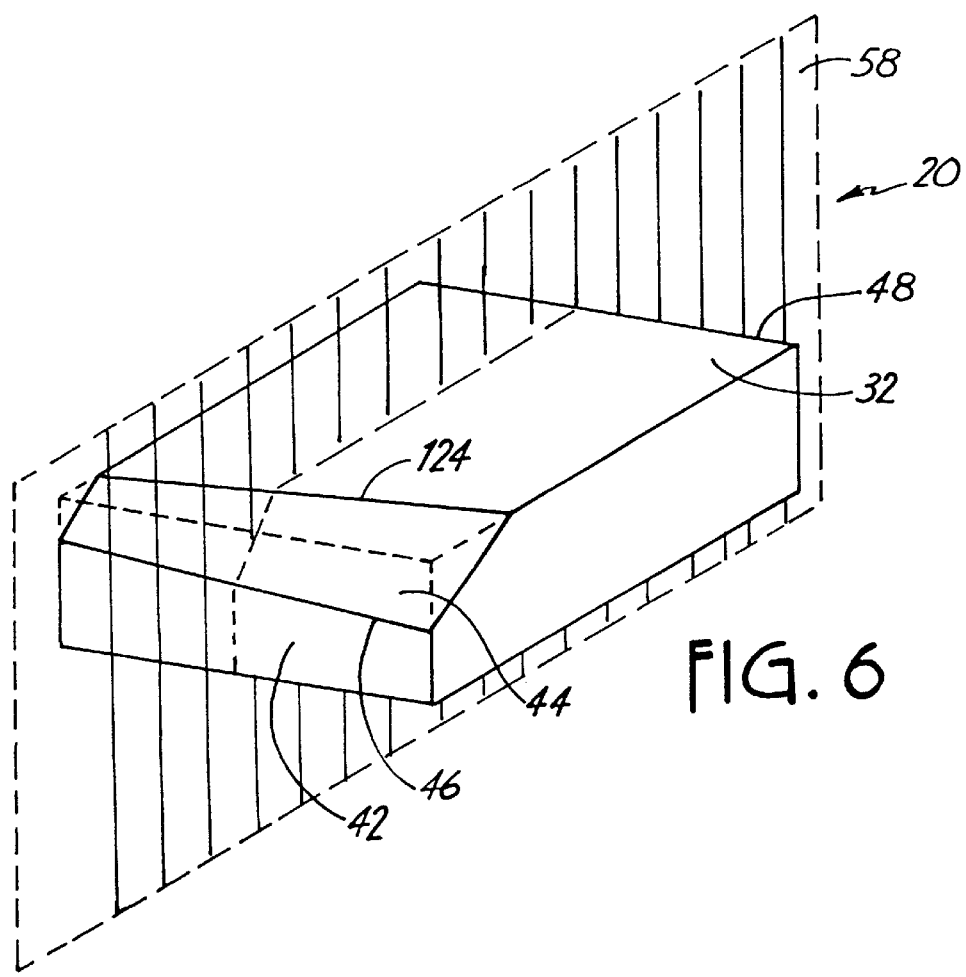
FIG. 6 is a perspective view of one embodiment of an individual slider of a slider bar as shown in FIG. 5, during an intermediate formation step.

FIG. 6 shows an individual slider 20 of FIG. 5, during an intermediate formation step. FIG. 6 shows longitudinal bisecting plane 58. As illustrated, taper surface 44 is substantially angled with respect to, but is not perpendicular to, air bearing surface 32. Taper surface 44 is asymmetric about longitudinal, bisecting plane 58. Taper surface 44 is not perpendicular to longitudinal, bisecting plane 58. Excess material may be removed from the central portion of air bearing surface 32 of slider 20, so that the remaining portions form rails, resulting in either the structure shown in FIG. 1 or FIG. 2. Rails 34, 36, and 38 may be formed on slider 20 before, simultaneously as, or after taper 44 is disposed on slider 20.

Figure 7:
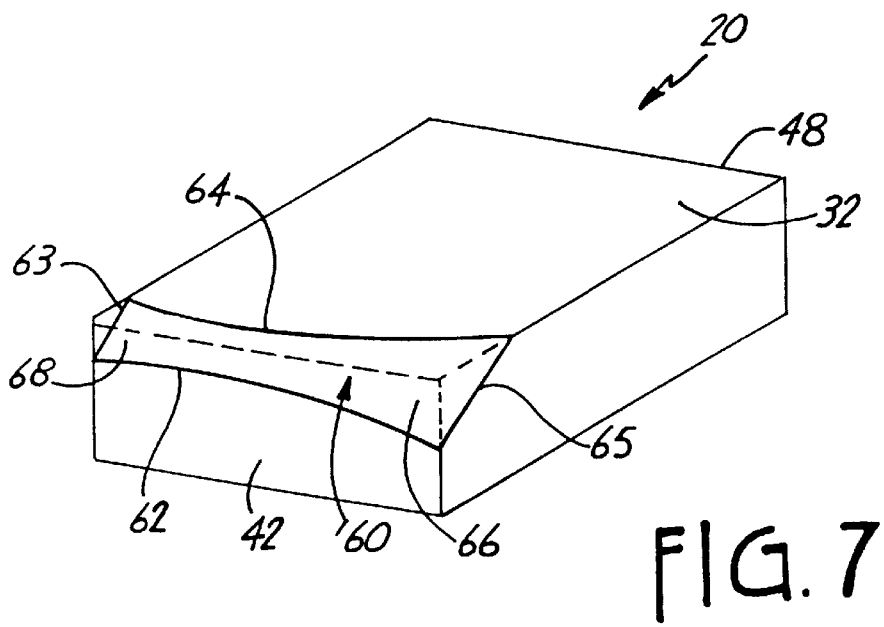
FIG. 7 is a perspective view of a second embodiment of an individual slider of a slider bar as shown in FIG. 5, during an intermediate formation step.

FIG. 7 represents a second embodiment of an individual slider 20 during an intermediate formation step. In this embodiment, taper surface 60 is nonplanar. Taper surface 60 is defined by contour lines as follows. Non-linear intersection 62 is formed between taper surface 60 and leading surface 42. Linear intersection 63 joins taper surface 60 and one side of slider 20. Non-linear intersection 64 connects taper surface 60 and air bearing surface 32. Linear intersection 65 links taper surface 60 and the other side of slider 20.

Usually, slider 20 will be oriented on a disc so that wider side 66 of taper surface 60 is on the inside of the disc (i.e., toward the axis of rotation of the disc), and narrower side 68 is on the outside of the disc. This orientation will help to equilibrate the fly height across the width of slider 20, resulting in correction of roll angle, as discussed with respect to FIG. 1. In this example, taper surface 60 curves back, away from leading surface 42. As slider 20 moves across the radius of a magnetic disc, the air flow under slider 20 does not generally flow straight from leading edge 42 back to trailing edge 48. Usually, the air flows at an angle with respect to longitudinal bisecting plane 58. As slider 20 moves across the radius of a magnetic disc, the air flow direction changes as the skew angle between slider 20 and the disc changes. Because taper surface 60 curves back, it presents a surface upon which the air may impinge, even though the air flow may be skewed on either side of longitudinal bisecting plane 58 of slider 20. Thus, taper surface 60 affects the pressurization of air flowing between air bearing surface 32 and a magnetic disc.

Figure 8:
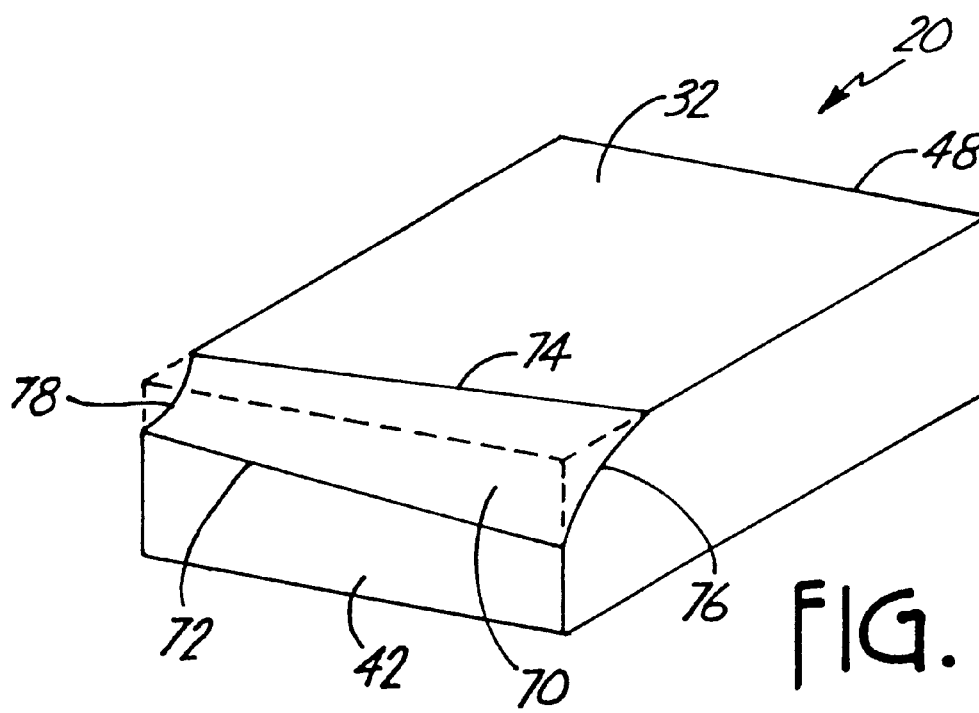
FIG. 8 is a perspective view of a third embodiment of an individual slider of a slider bar as shown in FIG. 5, during an intermediate formation step.

FIG. 8 shows a third embodiment of an individual slider 20 during an intermediate formation step. In this embodiment, taper surface 70 is nonplanar. This embodiment includes linear intersection 72 between taper surface 70 and leading surface 22. Linear intersection 74 forms the interface between taper surface 70 and air bearing surface 32. Non-linear intersection 76 is disposed between taper surface 70 and a side of slider 20. Non-linear intersection 78 is formed between taper surface 70 and the other side of slider 20. In this particular example, intersection 76 comprises a convex curve and intersection 78 comprises a concave curve. However, intersections 76 and 78 may comprise any nonlinear lines corresponding to a nonplanar taper surface 70. In this particular example, air pressurization will be higher on the side of slider 20 near convex curve 76 as compared to the side near concave curve 78. This is expected because of the relative sizes of taper surface 70 in each region, as well as the aerodynamic qualities of the surfaces involved.

Figure 9:
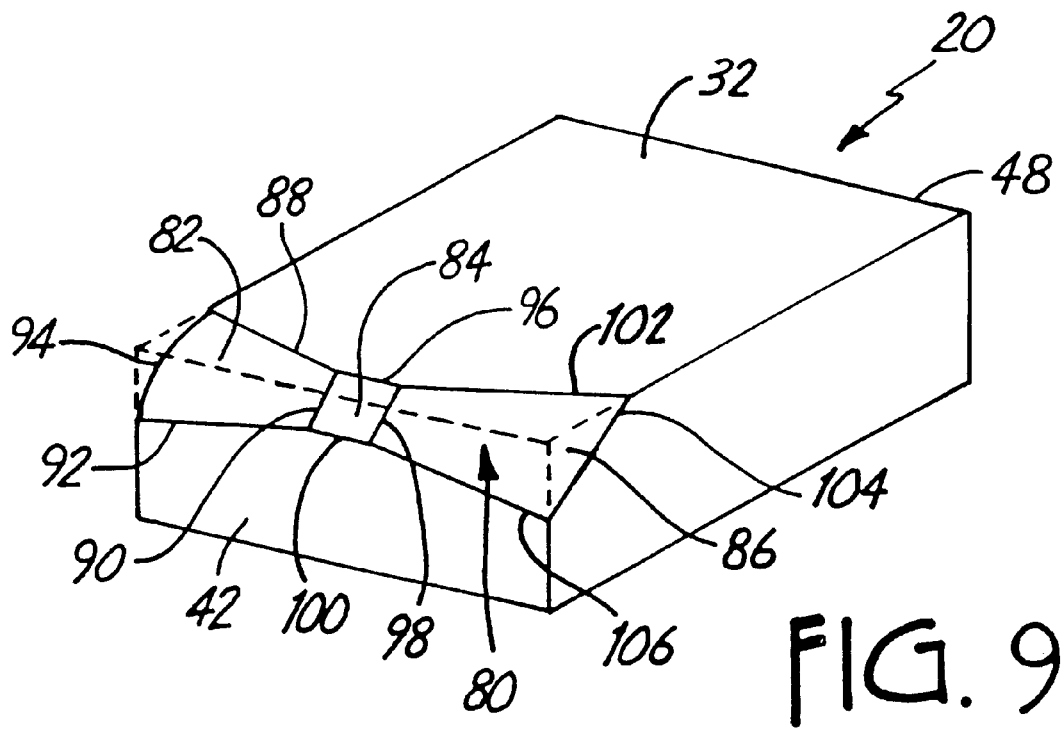
FIG. 9 is a perspective view of a fourth embodiment of an individual slider of a slider bar as shown in FIG. 5, during an intermediate formation step.

FIG. 9 represents a fourth embodiment of an individual slider 20 during an intermediate formation step. In this embodiment, taper surface 80 comprises a multiregional nonplanar surface including region 82, region 84, and region 86. Each region 82, 84, and 86 has a surface orientation different from that of an adjacent region. Region 82 is bound by linear intersections 88, 90, and 92; and nonlinear intersection 94. Region 84 is bound by linear intersections 90, 96, 98, and 100. Region 86 is bound by linear intersections 98, 102, 104, and 106. While taper surface 80 is almost symmetric about longitudinal bisecting plane 58, a difference in air pressurization is achieved by the side of slider 20 near line 104 as compared to the side of slider 20 near convex curve 94.

In general, any taper surface resulting in any combination of linear and non-linear intersections and any combination of planar and non-planar regions may be used, so long as taper surface is asymmetric with respect to a longitudinal, bisecting plane 58 of slider 20. The benefit of asymmetry on a leading taper of slider 20 is most significant during take-off, and less so during flight. A variety of different configurations may be used, depending on such factors as the shape and location of air bearing rails and other characteristics. A primary consideration in designing an asymmetric taper for a particular application is the need to increase or decrease air pressurization under certain parts of air bearing surface 32 of slider 20. This need may arise, for example, because of roll or other defects in take-off or flight.

Figure 10:
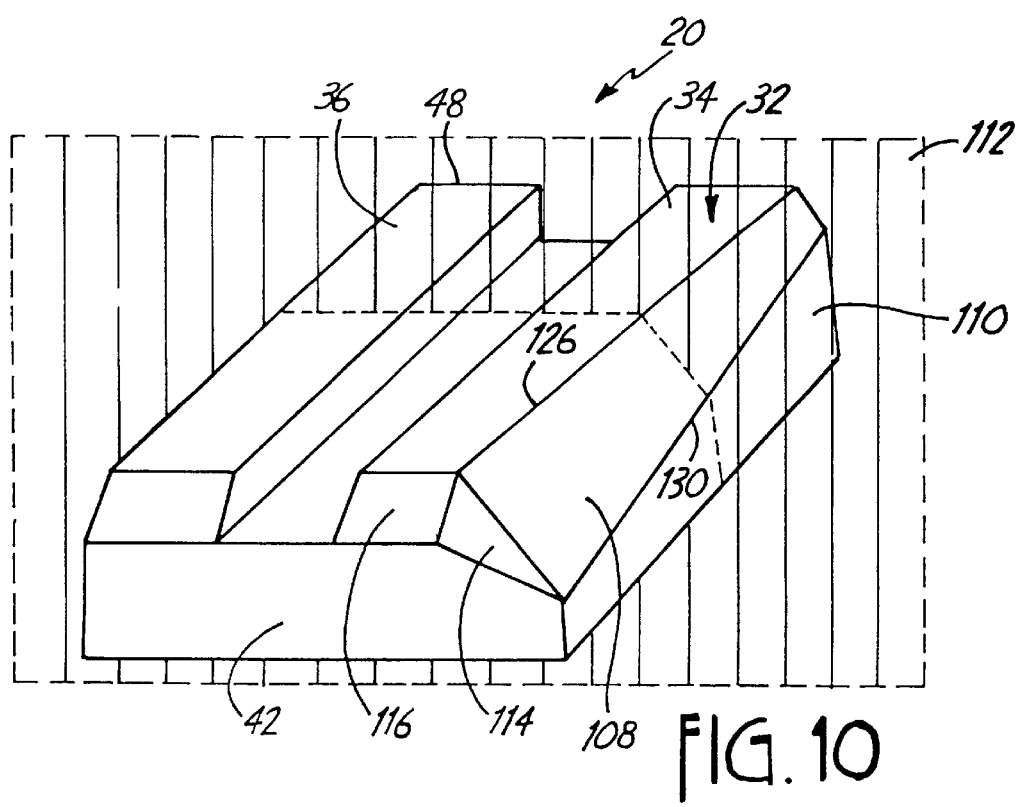
FIG. 10 is a perspective view of a fifth embodiment of a slider embodying the present invention.

FIG. 10 represents a fifth embodiment of a slider 20 embodying the present invention. In this embodiment, side taper surface 108 intersecting air bearing surface 32 and side surface 110 is asymmetric about latitudinal bisecting plane 112. FIG. 10 also shows asymmetric leading taper surface 114, which forms a smooth intersection between side taper surface 108, leading surface 42, and leading taper 116. An asymmetric taper on a side rail is most influential during flight, and less so during take-off. Side taper 108 allows more air to flow under inner rail 34 than outer rail 36. The asymmetric taper about latitudinal plane 112 also contributes to a higher air flow mass near the leading portion of taper 108, as compared to the trailing portion of taper 108. This feature can be used to correct twisting, pulling, or other forces which slider 20 may encounter.

Figure 11:
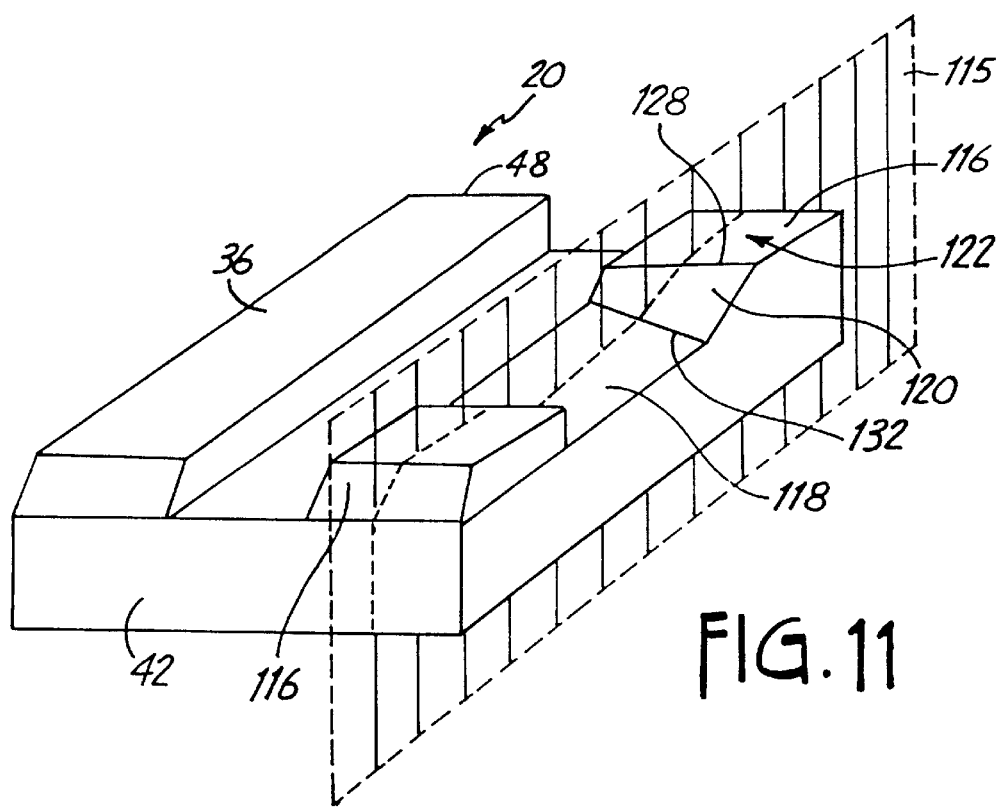
FIG. 11 is a perspective view of a sixth embodiment of a slider embodying the present invention.

FIG. 11 represents a sixth embodiment of a slider 20 embodying the present invention. In this embodiment, longitudinal plane 115 bisects inner rail 116. Inner rail 116 includes rail recess 118, which is of uniform depth along the length of slider 20. Asymmetric taper 120 intersects rail recess 118 and air bearing surface 122. Asymmetric taper 120 is not perpendicular to air bearing surface 122. Taper surface 120 is asymmetric about longitudinal, rail-bisecting plane 114. Taper surface 120 is not perpendicular to longitudinal, rail-bisecting plane 114. Taper surface 120 has a similar effect on air pressurization as taper 44 of FIG. 2. However, because taper 120 is smaller, its effect is smaller. Additionally, because taper 120 is disposed on side rail 116 rather than on leading surface 42, its effect is more significant during flight than during take-off.

All the embodiments of the present invention can be generally described as follows. Slider 20 comprises air bearing surface 32 and a second surface which is substantially perpendicular or substantially parallel to air bearing surface 32. The second surface may be, for example, leading surface 42 in FIGS. 2, 3, 6, 7, 8, or 9; side surface 110 in FIG. 10; or recessed surface 118 in FIG. 11. A taper surface intersects the air bearing surface at a first contour of intersection, which may be, for example, intersection 126 of FIG. 6; intersection 64 of FIG. 7; intersection 74 of FIG. 8; the sum of intersections 88, 96, and 102 of FIG. 9; intersection 126 of FIG. 10; or intersection 128 of FIG. 11. The taper surface intersects the second surface at a second contour of intersection, for example, leading edge 46 of FIG. 6; intersection 62 of FIG. 7; intersection 72 of FIG. 8; the sum of intersections 92, 100, and 106 of FIG. 9; intersection 130 of FIG. 10; or intersection 132 of FIG. 11. The taper surface is asymmetric about a plane containing the midpoint of the first contour of intersection and the midpoint of the second contour of intersection. In many cases, that plane will correspond to the slider or rail bisecting planes shown in FIGS. 6, 10, and 11. Generally, the taper surface is not perpendicular or parallel to the air bearing surface; and the taper surface is not perpendicular or parallel to the second surface.

While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention.

For example, while very simple examples have been illustrated for ease of discussion of the principles of this invention, it is contemplated that the invention can be incorporated into different or more complex slider configurations. Also, multiple asymmetric tapers may be disposed on a single slider. Moreover, while catamaran type sliders are depicted, the invention could be used with center pad style and other style sliders. References to more complex air bearing surface designs can be found, for example, in the following patents, which are assigned to Seagate and fully incorporated by reference: U.S. Pat. No. 5,062,017 to Strom et al. entitled "Hour-glass disk head slider," U.S. Pat. No. 5,343,343 to Chapin entitled "Air bearing slider with relieved rail ends," and U.S. Pat. No. 6,134,083 to Warmka entitled "Self-loading head slider having angled leading rails and non-divergent notched cavity dam."

What is claimed is:

1. An air bearing slider comprising a slider body having an air bearing surface on a disc opposing face, where the slider body has a leading surface and a longitudinal, bisecting plane, and a tapered surface intersecting the leading surface; wherein the tapered surface is not perpendicular to the air bearing surface; wherein the tapered surface is asymmetric about the longitudinal bisecting plane; wherein the tapered surface is not perpendicular to the longitudinal, bisecting plane; wherein the tapered surface is not parallel to the longitudinal, bisecting plane; and wherein the tapered surface asymmetrically controls airflow across the air bearing surface to provide increased airflow to a selected portion of the air bearing surface.

2. An air bearing slider comprising a slider body, the slider body comprising:
   an air bearing surface on a disc opposing face;
   a second surface;
   a tapered surface intersecting the air bearing surface at a first contour of intersection and intersecting the second surface at a second contour of intersection;
   a first midpoint of the first contour of intersection;
   a second midpoint of the second contour of intersection; and
   a plane containing the first midpoint and the second midpoint;
   wherein the tapered surface is asymmetric about the plane;
   wherein the tapered surface is not perpendicular or parallel to the air bearing surface;
   wherein the tapered surface is not perpendicular or parallel to the second surface; and
   wherein the tapered surface asymmetrically controls airflow across the air bearing surface to provide increased airflow to a selected portion of the air bearing surface.

3. An air bearing slider comprising a slider body having an air bearing surface on a disc opposing face, where the slider body has a leading surface and a longitudinal, bisecting plane, and a tapered surface intersecting the leading surface and the air bearing surface; wherein the tapered surface is not perpendicular to the air bearing surface; wherein the tapered surface is asymmetric about the longitudinal, bisecting plane; wherein the tapered surface is not perpendicular to the longitudinal, bisecting plane; and wherein the tapered surface asymmetrically controls airflow across the air bearing surface to provide increased airflow to a selected portion of the air bearing surface.

4. The slider of claim 3 in which the tapered surface is nonplanar.

5. The slider of claim 4 in which an intersection of the tapered surface and the leading surface comprises a nonlinear edge.

6. The slider of claim 5 in which an intersection of the tapered surface and the air bearing surface comprises a nonlinear edge.

7. The slider of claim 4 in which an intersection of the tapered surface and the air bearing surface comprises a nonlinear edge.

8. The slider of claim 4 in which the tapered surface is curved.

9. The slider of claim 3 in which the tapered surface comprises a plurality of regions, each region having a tapered surface orientation different from that of an adjacent region.

10. An air bearing slider comprising:
    a slider body having a disc opposing face, a longitudinal bisecting plane, and a latitudinal bisecting plane;
    a side surface along a longitudinal plane disposed on the slider body;

an air bearing surface defined on the disc opposing face; and a tapered surface intersecting the side surface and the air bearing surface, wherein the tapered surface is not perpendicular to the air bearing surface; wherein the tapered surface is asymmetric about the longitudinal bisecting plane and asymmetric about the latitudinal bisecting plane and wherein the tapered surface is not perpendicular to the latitudinal bisecting plane.

11. The slider of claim 10 in which the tapered surface comprises a plurality of regions, each region having a tapered surface orientation different from that of an adjacent region.

12. The slider of claim 10 in which the tapered surface is nonplanar.

13. The slider of claim 12 in which an intersection of the tapered surface and the side surface comprises a nonlinear edge.

14. The slider of claim 12 in which an intersection of the tapered surface and the air bearing surface comprises a nonlinear edge.

15. An air bearing slider comprising:

a slider body having a disc opposing face;

an air bearing surface defined on the disc opposing face;

a side rail defined on the slider body, the side rail having an air bearing surface, a recessed surface, and a longitudinal, rail-bisecting plane; and a tapered surface disposed on the side rail, the tapered surface intersecting the air bearing surface of the side rail and the recessed surface of the side rail; wherein the tapered surface is not perpendicular to the air bearing surface; wherein the tapered surface is asymmetric about the longitudinal, rail-bisecting plane; and wherein the tapered surface is not perpendicular to the longitudinal, rail-bisecting plane.

16. The slider of claim 15 in which the tapered surface comprises a plurality of regions, each region having a tapered surface orientation different from that of an adjacent region.

17. The slider of claim 15 in which the tapered surface is non-planar.

18. The slider of claim 17 in which an intersection of the tapered surface and the air bearing surface comprises a nonlinear edge.

19. The slider of claim 17 in which an intersection of the tapered surface and the recessed surface comprises a non-linear edge.

* * * * *